US010754636B2

(12) United States Patent
Hsu

(10) Patent No.: US 10,754,636 B2
(45) Date of Patent: Aug. 25, 2020

(54) COMMUNICATION DEVICE UPDATING SYSTEM

(71) Applicant: PEGATRON CORPORATION, Taipei (TW)

(72) Inventor: Sheng-Wei Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/152,412

(22) Filed: Oct. 4, 2018

(65) Prior Publication Data

US 2019/0138291 A1 May 9, 2019

(30) Foreign Application Priority Data

Nov. 9, 2017 (TW) .............................. 106138831 A

(51) Int. Cl.
*G06F 9/44* (2018.01)
*G06F 8/65* (2018.01)
*H04L 12/18* (2006.01)
*G06F 8/654* (2018.01)

(52) U.S. Cl.
CPC ................ *G06F 8/65* (2013.01); *G06F 8/654* (2018.02); *H04L 12/18* (2013.01); *H04L 12/1854* (2013.01)

(58) Field of Classification Search
CPC . G06F 8/65; G06F 8/654; H04L 12/18; H04L 12/1854
USPC ........................................................ 717/173
See application file for complete search history.

(56) References Cited

U.S. PATENT DOCUMENTS

| 5,923,654 | A | * | 7/1999 | Schnell | ................. | H04L 45/745 |
| | | | | | | 370/390 |
| 6,331,983 | B1 | * | 12/2001 | Haggerty | .............. | H04L 12/185 |
| | | | | | | 370/400 |
| 6,484,315 | B1 | * | 11/2002 | Ziese | ........................ | G06F 8/65 |
| | | | | | | 707/999.202 |
| 9,826,502 | B2 | * | 11/2017 | Cherian | .............. | H04W 72/005 |
| 2002/0167950 | A1 | * | 11/2002 | Chang | ..................... | H04L 12/66 |
| | | | | | | 370/396 |

(Continued)

FOREIGN PATENT DOCUMENTS

| CN | 1614558 A | | 5/2005 |
| JP | 2013046175 A | * | 3/2013 |
| TW | 201633811 A | | 9/2016 |

OTHER PUBLICATIONS

Leo, "What's the difference between a hub, a switch, and a router?", 2013, from https//askleo.com, 8 pages. (Year: 2013).*

(Continued)

*Primary Examiner* — Ted T. Vo
(74) *Attorney, Agent, or Firm* — McClure, Qualey & Rodack, LLP

(57) ABSTRACT

A communication device updating system includes a network switch, a plurality of first devices, and a second device. Each of the plurality of first devices is communicatively coupled to the network switch. The second device is communicatively coupled to the network switch, and is configured to store a communication device firmware file, wherein the second device multicasts the communication device firmware file to each of the plurality of first devices through the network switch, and each of the plurality of first devices is updated according to the received communication device firmware file.

7 Claims, 4 Drawing Sheets

(56) References Cited

U.S. PATENT DOCUMENTS

| | | | | |
|---|---|---|---|---|
| 2006/0235949 A1* | 10/2006 | Tai | ............................ | G06F 8/65 |
| | | | | 709/219 |
| 2009/0019435 A1* | 1/2009 | Piechowski | ............... | G06F 8/65 |
| | | | | 717/176 |
| 2014/0043267 A1* | 2/2014 | Hsu | ........................ | G06F 3/041 |
| | | | | 345/173 |

OTHER PUBLICATIONS

Jeff Tyson, "How LAN Switches Work", 2016, Retrieved from https://web.archive.org/web/20161003061532/http:// computer.howstuffworks.com/lan-switch.htm/printable/, 20 pages. (Year: 2016).*

* cited by examiner

COMMUNICATION DEVICE UPDATING SYSTEM

CROSS-REFERENCE TO RELATED APPLICATION

This application claims priority to Taiwan Application Serial Number 106138831, filed Nov. 9, 2017, which is herein incorporated by reference in its entirety.

BACKGROUND

Field of Invention

The present disclosure relates to an updating system. More particularly, the present disclosure relates to a communication device updating system capable of increasing efficiency.

Description of Related Art

Before shipping to stores and retailers, the firmware of the communication devices, such as the modem or router, have to be updated. The conventional update method is to transmit the essential update file to the communication devices needed to be updated by a computer through the trivial file transfer protocol (TFTP) or other unicast protocols similar to the TFTP protocol.

However, because of limitation of the unicast protocol, the computer cannot simultaneously update multiple communication devices. As a result, a user has to manage multiple communication devices having different update progresses, and thereby the management difficulty of a production line is increased. In addition, the computer has to output multiple communicative streaming to the multiple communication devices receiving the update file respectively. Therefore, the number of the communication devices that can be updated simultaneously is limited by the output bandwidth or the data processing capability of the computer. Accordingly, the conventional update method renders the efficiency of the production line hard to be increased.

SUMMARY

The disclosure provides a communication device updating system. The communication device updating system comprises a network switch, a plurality of first devices, and a second device. Each of the plurality of first devices is communicatively coupled to the network switch. The second device is communicatively coupled to the network switch, and is configured to store a communication device firmware file, wherein the second device multicasts the communication device firmware file to each of the plurality of first devices through the network switch, and each of the plurality of first devices is updated according to the received communication device firmware file.

The foregoing communication updating system is capable of multicasting the communication device firmware file, and thereby is capable of updating the numerous first devices simultaneously. Accordingly, by applying the communication updating system to a production line, operation speed of the production line will be significantly increased.

BRIEF DESCRIPTION OF THE DRAWINGS

The present disclosure can be fully understood by reading the following detailed description of the embodiment, with reference made to the accompanying drawings as follows.

DETAILED DESCRIPTION

Figure 1:
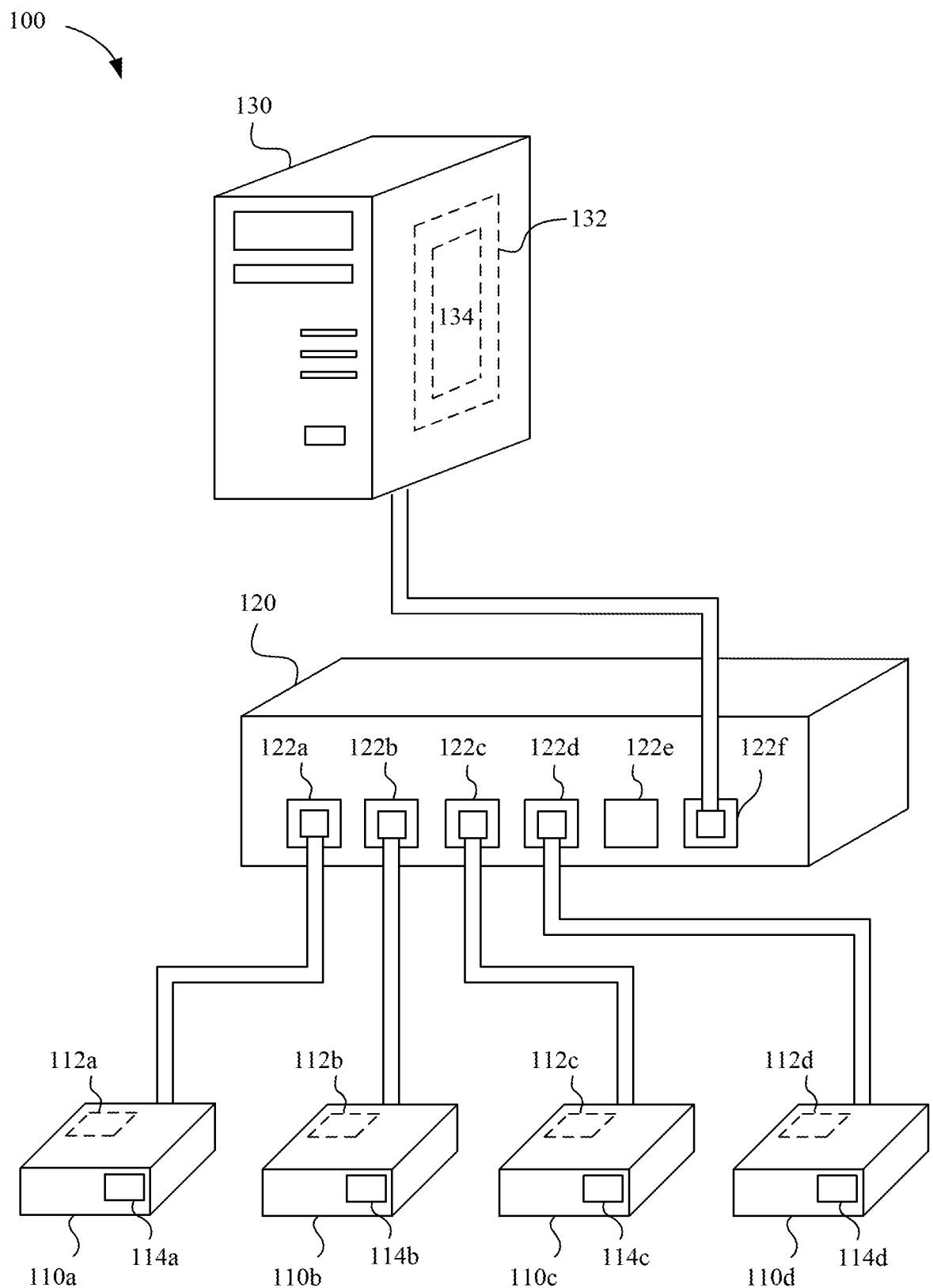
FIG. 1 is a simplified functional block diagram of a communication device updating system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a communication device updating system 100 according to one embodiment of the present disclosure. As shown in FIG. 1, the communication device updating system 100 comprises a plurality of first devices 110*a*-110*d*, a network switch 120, and a second device 130. The network switch 120 comprises a plurality of connection ports 122*a*-122*f*, wherein each of the connection ports 122*a*-122*f* is configured to communicatively coupled to one of the first devices 110*a*-110*d*, or communicatively coupled to the second device 130. In addition, the first devices 110*a*-110*d* comprise verification units 112*a*-112*d* respectively, and comprise alarm units 114*a*-114*d* respectively.

A nonvolatile memory 132 of the second device 130 stores a communication device firmware file 134. The second device 130 is capable of transmitting the communication device firmware file 134 to each of the first devices 110*a*-110*d* to update the first devices 110*a*-110*d*. For the sake of brevity, other functional blocks of the communication device updating system 100 are not shown in FIG. 1.

In practice, the first devices 110*a*-110*d* comprise at least one modem or at least one router. The second device 130 may be realized by a desktop computer, a laptop, or varies suitable servers.

Throughout the specification and drawings, the number of the first devices 110*a*-110*d* and the connection ports 122*a*-122*f* is merely an exemplary embodiment, and does not intend to restrict the amount of the components and devices to any specific number. In one embodiment, the network switch 120 may have 16 ports. In another embodiment, the network switch 120 may have 24 ports. In yet another embodiment, the number of the first devices 110 may be appropriately increased or decreased according to the number of the connection ports 122 of the network switch 120.

In addition, in the specification and drawings, if a reference label of a particular component or device is used without having an index, it means that the reference label is used to refer to any unspecific component or device of corresponding component group or device group. For example, the reference label 110*a* is used to refer to the specific first device 110*a*, and the reference label 110 is used to refer to any unspecific first device 110 of the first devices 110*a*-110*d*. In another example, the reference label 122*a* is used to refer to the specific connection port 122*a*, and the reference label 122 is used to refer to any unspecific connection port 122 of the connection ports 122*a*-122*f*.

Figure 2:
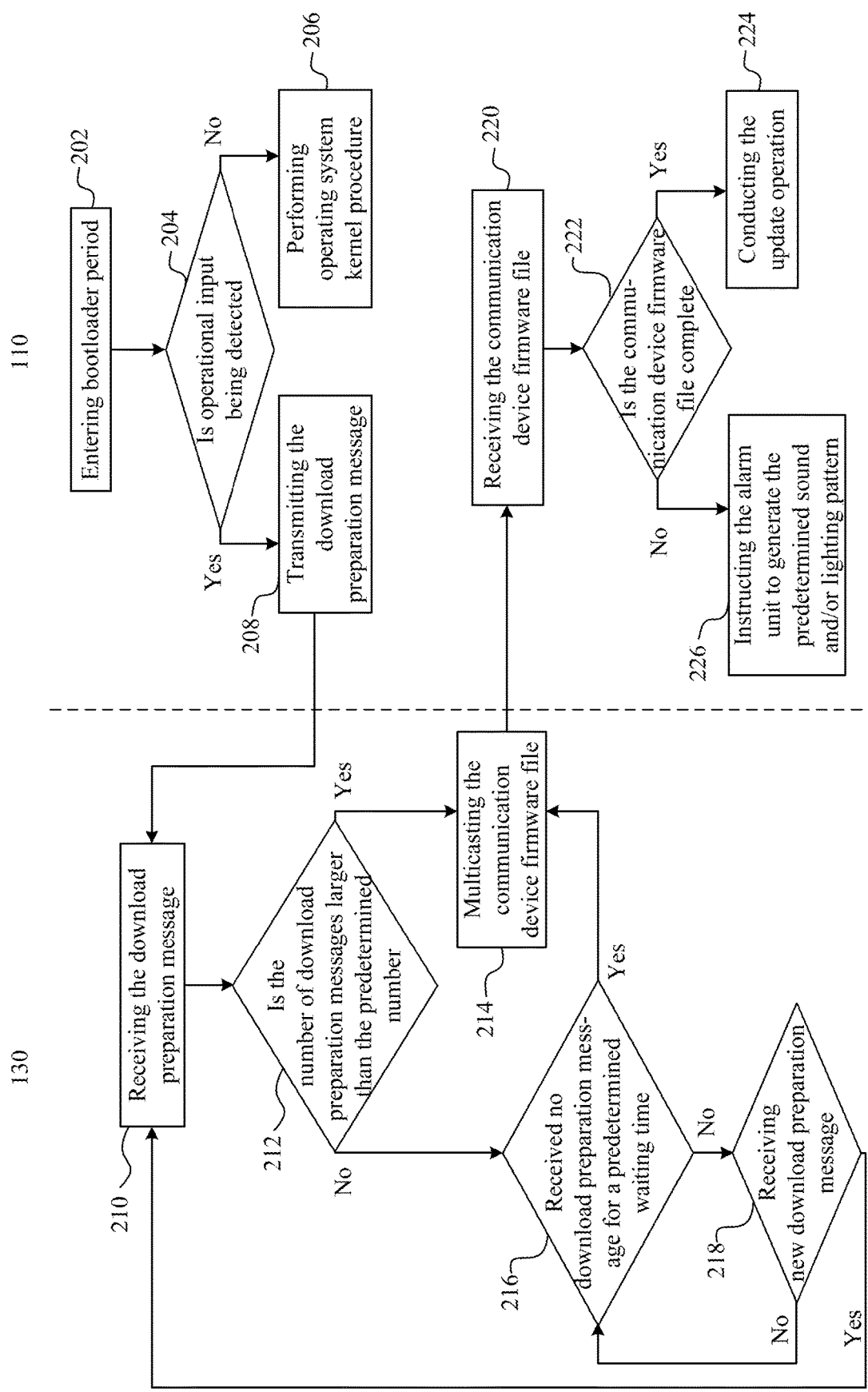
FIG. 2 is a simplified flowchart illustrating the operations of the communication device updating system of FIG. 1 according to one embodiment of the present disclosure.
Figure 3:
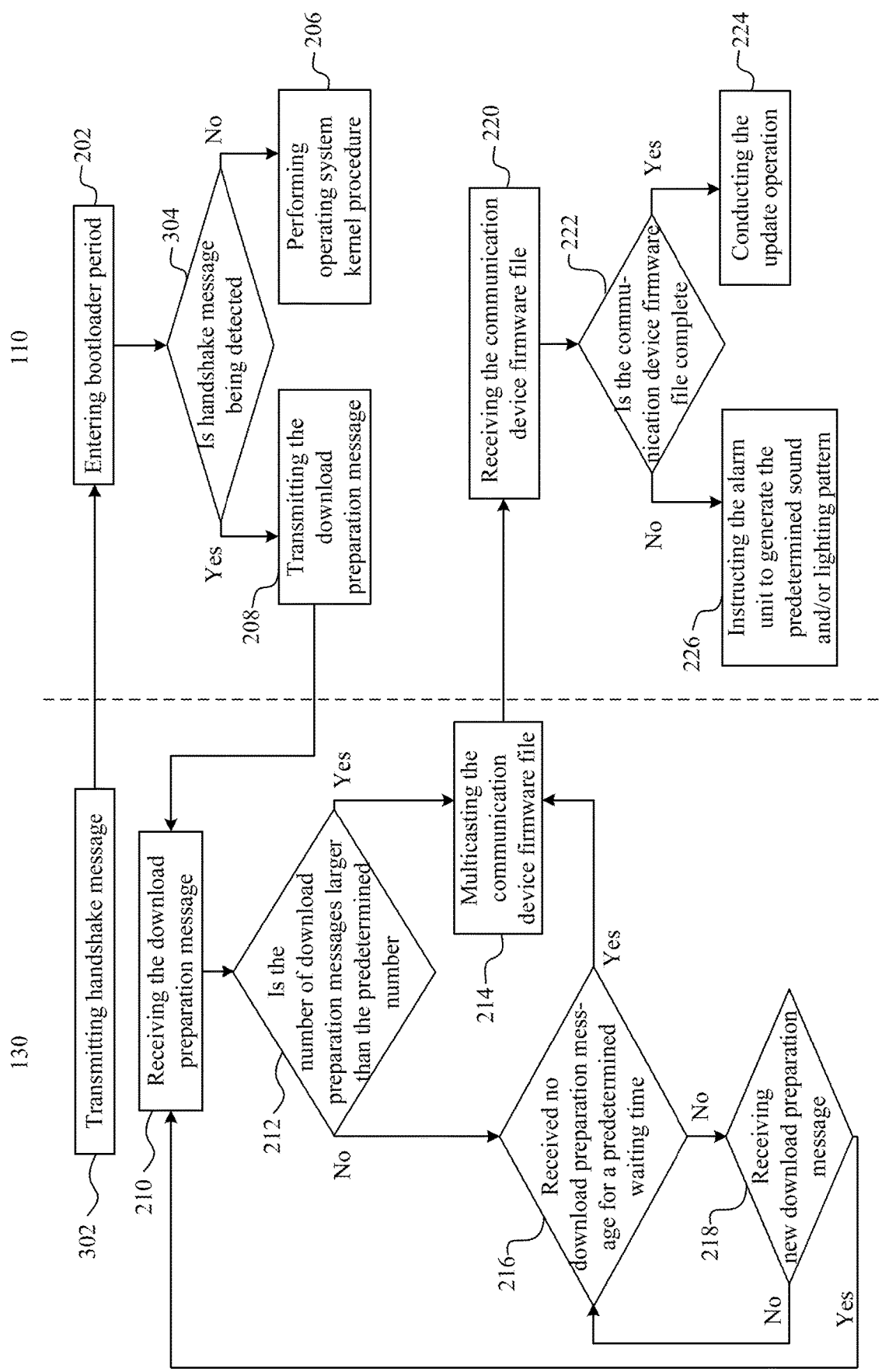
FIG. 3 is a simplified flowchart illustrating the operations of the communication device updating system of FIG. 1 according to another embodiment of the present disclosure.
Figure 4:
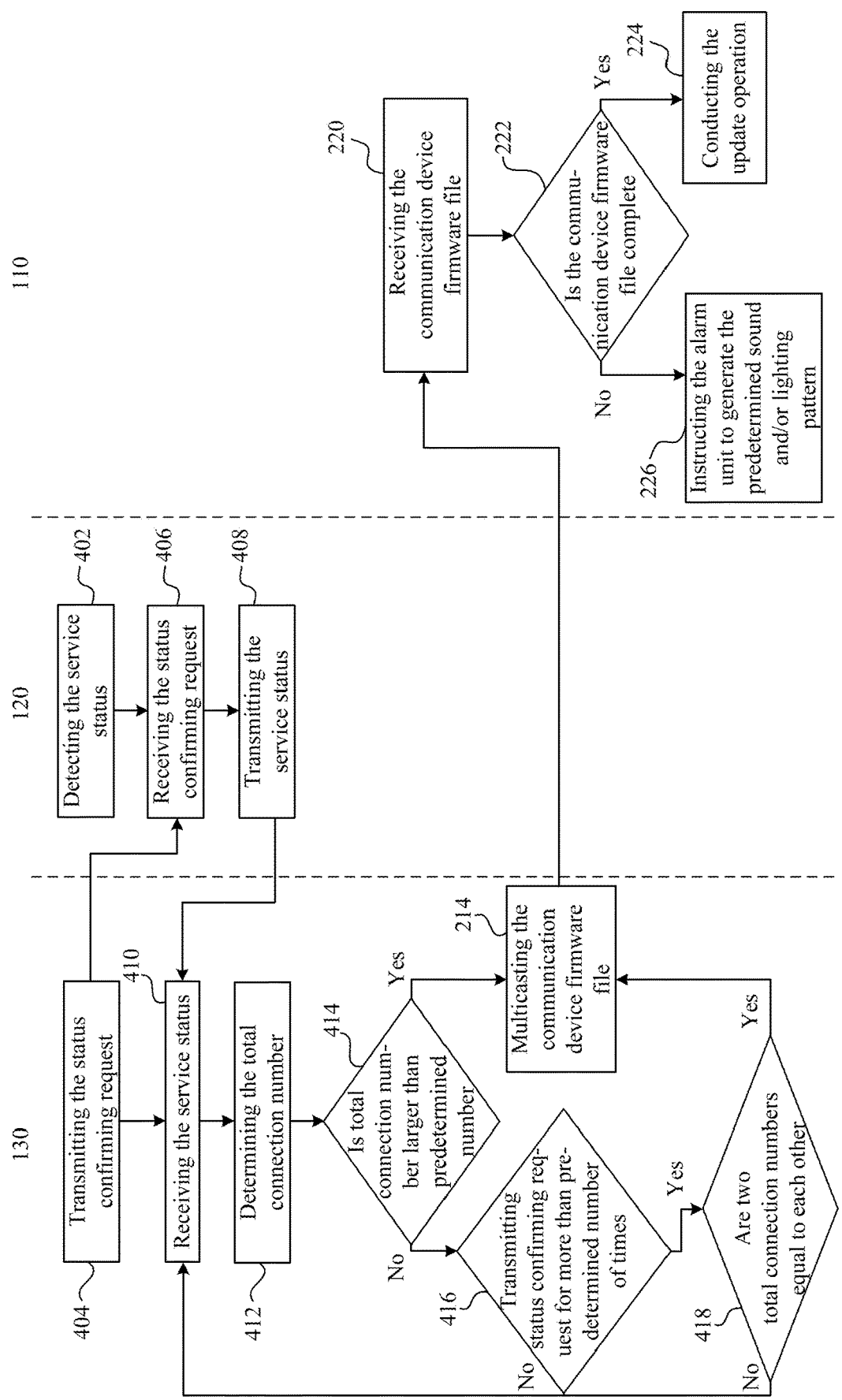
FIG. 4 is a simplified flowchart illustrating the operations of the communication device updating system of FIG. 1 according to yet another embodiment of the present disclosure.

For the purpose of explanatory convenience in the following description, the communication device updating system 100 will be further described by reference to several embodiments that the first devices 110a-110d are communicatively coupled to the connection ports 122a-122d respectively, and the second device 130 is communicatively coupled to the connection port 122f. FIG. 2 is a simplified flowchart illustrating the operations of the communication device updating system 100 of FIG. 1 according to one embodiment of the present disclosure. In FIGS. 2-4, operations within a column under the reference label of a specific device are operations to be performed by the specific device. For example, operations within a column under the label "110" are operations to be performed by one of the first devices 110a-110d, operations within a column under the label "120" are operations to be performed by the network switch 120, and operations within a column under the label "130" are operations to be performed by the second device 130.

In operation 202, the first device 110 enters a bootloader period.

In operation 204, the first device 110 determines whether an operational input is detected. If the first device 110 does not detect the operational input during the bootloader period, the first device 110 would conduct operation 206. If the first device 110 detects the operational input during the bootloader period, the first device 110 would conduct operation 208.

In some embodiments, the aforesaid operational input may be an input signal generated by a button of the first device 110 (not shown in FIG. 1) while the button is manipulated by a user by a specific manner. For example, the operational input may be generated by pressing the button of the first device 110 for a predetermined number of times, or continuously pressing the button of the first device 110 for a predetermined time period.

In operation 206, the first device 110 performs the operating system kernel procedure (e.g., Linux OS).

On the other hand, in operation 208, the first device 110 enters an update waiting period, and transmits a download preparation message to the second device 130 through the network switch 120. It is worth mentioning that in operation 206, the first device 110 would not transmit the download preparation message to the second device 130.

In operation 210, the second device 130 receives the download preparation message from the first device 110 through the network switch 120.

In operation 212, the second device 130 calculates the number of the received download preparation messages. When the total number of the download preparation messages received by the second device 130 is larger than or equal to a predetermined number, the second device 130 would conduct operation 214. When the total number of the download preparation messages received by the second device 130 is smaller than the predetermined number, the second device 130 would conduct operation 216.

In some embodiment, for example, the predetermined number is configured to be 4, and each of the first devices 110a-110d transmits the download preparation message to the second device 130. Therefore, the total number of the download preparation messages (e.g., 4) received by the second device 130 is equal to the predetermined number, and thereby rendering the second device 130 to conduct operation 214.

The predetermined number may also be configured to be equal to the total number of the connection ports 122 that are configured to communicatively couple to the first devices 110. For example, in some embodiments of the communication device updating system 100, the total number of the connection ports 122 that are configured to communicatively couple to the first devices 110 is 5 (e.g., the connection ports 122a-122e), and thus the predetermined number is configured to be 5. Therefore, even if each of the first devices 110a-110d transmits the download preparation message to the second device 130, the total number of the download preparation messages (e.g., 4) received by the second device 130 is still smaller than the predetermined number, and thereby rendering the second device 130 to conduct operation 216.

In operation 214, the second device 130 multicasts the communication device firmware file 134 to each of the first devices 110a-110d. That is, the second device 130 would transmit a single communication streaming comprising the communication device firmware file 134 to the network switch 120. The network switch 120 copies the received communication streaming, and then transmits a plurality of copied communication streaming to the first devices 110a-110d, respectively.

Then, in operation 216, the second device 130 will calculate the length of the duration of no download preparation message received, and further calculates whether the duration is longer than a predetermined waiting time. If the duration is longer than the predetermined waiting time, the second device 130 may conduct the aforementioned operation 214. If the duration is shorter than the predetermined waiting time, the second device 130 may conduct operation 218.

In operation 218, the second device 130 determines whether a new download preparation message is received. If the second device 130 receives a new download preparation message, the second device 130 may conduct the aforementioned operation 210, and reset the duration that no download preparation message was received by the second device 130. If the second device 130 does not receive the new download preparation message, the second device 130 may repeatedly conduct the operation 216, and continuously calculate the length of the duration that no download preparation message was received by the second device 130.

In other words, by adapting the operations of FIG. 2, the communication device updating system 100 may wait for other first devices (not shown in FIG. 1), which is different from the first devices 110a-110d, to communicatively coupled to the network switch 120.

In some embodiment, for example, in the situation that the length of the duration that no download preparation message was received by the second device 130 is shorter than the predetermined waiting time, the user may communicatively couple a first devices 110, which is different from the first devices 110a-110d, to the network switch 120 (e.g., communicatively coupling the network switch 120 through the connection port 122e). As a result, the second device 130 can transmit the communication device firmware file 134 to more first devices 110 in a single transmission, so as to increase the efficiency of the communication device updating system 100.

In operation 220, the first device 110 receives the communication device firmware file 134 from the second device 130.

Then, in operation 222, the verification unit 112 of the first device 110 verifies whether the communication device firmware file 134 received by the first device 110 is complete according to a checksum of the communication device firmware file 134 received by the first device 110. If the verification unit 112 determines that the communication device firmware file 134 received by the first device 110 is complete, the first device 110 may conduct the operation 224. If the verification unit 112 determines that the communication device firmware file 134 received by the first device 110 is not complete, the first device 110 may conduct operation 226.

In one embodiment, the verification unit 112 may be realized by a computer program stored in the first device 110. In another embodiment, the verification unit 112 may be realized by various suitable circuits integrated in the first device 110 such as the application specific integrated circuit (ASIC) or the digital signal processing (DSP) chip.

In operation 224, the first device 110 is updated according to the received communication device firmware file 134.

On the other hand, in operation 226, the first device 110 informs the user that the update of the first device 110 fails by using the alarm unit 114 to generate a predetermined sound, a predetermined lighting pattern, or a combination of the predetermined sound and the predetermined lighting pattern.

In one embodiment, the alarm unit 114 may be realized by various suitable circuits comprising at least a buzzer and at least a lighting element (e.g., the LED).

In the embodiment of FIG. 2, if a first device 110 (e.g., a modem or a router) communicatively coupled to the network switch 120 detects an operational input during the bootloader period, the first device 110 enters the update waiting period. After a plurality of first devices 110 are sequentially communicatively coupled to the network switch 120, if the second device 130 detects that the number of the first devices 110, which have entered the update waiting period, matches with a threshold number, the second device 130 multicasts the communication device firmware file 134 to each of the first devices 110*a*-110*d* in parallel. As a result, each of the first devices 110*a*-110*d* would start to download the communication device firmware file 134 at approximately the same time, and would complete the update at approximately the same time. In one embodiment, the operations of FIG. 2 are applied to a production line, and the production line would have a number of merits, including easy management and high efficiency, because of the first devices 110 are capable of updating simultaneously.

FIG. 3 is a simplified flowchart illustrating the operations of the communication device updating system 100 of FIG. 1 according to another embodiment of the present disclosure. Please refers to FIG. 3, in operation 202, the first device 110 enters a bootloader period.

In operation 302, the second device 130 transmits a handshake message to the first device 110.

Then, in operation 304, the first device 110 determines whether the handshake message from the second device 130 is detected by the first device 110. If the first device 110 does not detect the handshake message during the bootloader period, the first device 110 may conduct operation 206. If the first device 110 detects the handshake message during the bootloader period, the first device 110 may then conduct operations 208-226. The operations 208-226 of FIG. 3 is similar to the operations 208-226 of FIG. 2, for the sake of brevity, those descriptions will not be repeated here.

In practice, before the second device 130 starts to transmit the communication device firmware file 134, the second device 130 may broadcast the handshake message to each of the first devices 110*a*-110*d* several times.

In the embodiment of FIG. 3, if a first device 110 (e.g., a modem or router) communicatively coupled to the network switch 120 detects the handshake message during the bootloader period, the first device 110 enters the update waiting period. After a plurality of first devices 110 sequentially communicatively coupled to the network switch 120, if the second device 130 detects that the number of the first devices 110, which have entered the update waiting period, matches with a threshold number, the second device 130 multicasts the communication device firmware file 134 to each of the first devices 110*a*-110*d* in parallel.

In the embodiment of FIG. 3, the second device 130 may actively trigger the first device 110 to enter the update waiting period. Therefore, in an embodiment that the operations of FIG. 3 are applied to a production line, an employer work on the production line only needs to couple the transmission lines of each of the first devices 110*a*-110*d* to the connection ports 122 of the network switch 120 without further operations on the first devices 110*a*-110*d*. The second device 130 would actively trigger the first devices 110*a*-110*d* to enter the update waiting period. Then, if the second device 130 determines that the total connection number of the first device 110 matches with the threshold number, the second device 130 would starts to multicast the communication device firmware file 134. Therefore, in comparison with the embodiment of FIG. 2, the embodiment of FIG. 3 is more automated.

FIG. 4 is a simplified flowchart illustrating the operations of the communication device updating system 100 of FIG. 1 according to yet another embodiment of the present disclosure. Please refer to FIG. 4, in operation 402, the network switch 120 detects the service status of the connection ports 122*a*-122*f*.

In operation 404, the second device 130 transmits a status confirming request to the network switch 120.

In operation 406, the network switch 120 receives the status confirming request from the second device 130.

Then, in the operation 408, after receiving the status confirming request, the network switch 120 transmits the service status of the connection ports 122*a*-122*f* to the second device 130.

In the operation 410, the second device 130 receives the service status of the connection ports 122*a*-122*f* from the network switch 120.

For the sake of brevity, the total number of the first devices 110 that have been communicatively coupled to the network switch 120 and have entered the update waiting period is hereinafter refer to as "total connection number." In operation 412, the second device 130 determines the total connection number according to the aforementioned service status.

In operation 414, the second device 130 compares the total connection number with a predetermined number. If the total connection number is larger than or equal to the predetermined number, the second device 130 may conduct operation 214. If the total connection number is smaller than the predetermined number, the second device 130 may conduct operation 416.

In operation 214, the second device 130 starts to multicast the communication device firmware file 134 to each of the first devices 110*a*-110*d*. That is, the second device 130 transmits a communication streaming comprising the communication device firmware file 134 to the network switch 120. Then, the network switch 120 copies the communication streaming, and transmits a plurality of copied communication streaming to the first devices 110*a*-110*d* respectively.

In operation 416, the second device 130 further compares the number of times, that the second device 130 transmits the status confirming request, with a predetermined number of times. If the number of times, that the second device 130 transmits the status confirming request, is larger than the predetermined number of times, the second device 130 may conduct operation 418. If the number of times, that the second device 130 transmits the status confirming request, is smaller than the predetermined number of times, the second device 130 may, after a predetermined waiting time (e.g., including, but not limited to 10 or 20 seconds), conduct the aforementioned operation 404 to transmit the status confirming request again. Therefore, after the predetermined waiting time, the network switch 120 would again transmit the service status of the connection ports 122a-122f to the second device 130. The second device 130 would store the total connection numbers generated by different determinations into a queue according to the generating time of each of the total connection numbers.

In operation 418, the second device 130 compares two total connection numbers generated by the last two determinations. If the two total connection numbers are equal to each other, which refers to that no new first device 110 is communicatively coupled to the network switch 120 during the aforementioned predetermined waiting time, the second device 130 may conduct the aforementioned operation 214. If the two total connection numbers are different, which refers to that a first device 110 is communicatively coupled or disconnected to the network switch 120, the second device 130 may conduct operation 404 to transmit the status confirm request again.

In other words, by adapting the operations of FIG. 4, the communication device updating system 100 can wait for other first devices 110 (not shown in FIG. 1), which is different from the first devices 110a-110d, to be communicatively coupled to the network switch 120.

In some embodiment, for example, in the situation that the number of times, that the second device 130 transmits the status confirming request, is smaller than the predetermined number, the user may communicatively couple a first device 110, which is other than the first devices 110a-110d, to the network switch 120 (e.g., communicatively coupling to the network switch 120 via the connection port 122e). As a result, the second device 130 can transmit the communication device firmware file 134 to more first devices 110 in a single transmission to increase the efficiency of the communication device updating system 100.

In this embodiment, when the second device 130 finishes the operation 214, the first device 110 may then conduct the operations 220-226. The operations 220-226 of FIG. 4 is similar to the operations 220-226 of FIG. 2, for the sake of brevity, those descriptions will not be repeated here.

In the embodiment of FIG. 4, if the second device 130 detects that the number of the first devices 110, which have entered the update waiting period, matches with the threshold number, the second device 130 multicasts the communication device firmware file 134 to each of the first devices 110a-110d in parallel.

In addition, in the embodiment of FIG. 4, the detection of the total connection number is performed by the network switch 120, and the calculation and communication regarding to the total connection number is performed by the second device 130 and the network switch 120. Therefore, in the embodiment that the operations of FIG. 4 is applied to an production line, an employee work on the production line only needs to couple the transmission lines of each of the first devices 110a-110d to the connection ports 122 of the network switch 120 without further operations on the first devices 110a-110d. The second device 130 and network switch 120 would actively perform the calculation and communication regarding to the total connection number. If the second device 130 determines that the total connection number matches with the threshold number, the second device 130 would start to multicast the communication device firmware file 134.

As can be appreciated from the foregoing descriptions, by adapting multicasting method, the communication device updating system 100 can simultaneously update numerous first devices 110. Therefore, if the communication device updating system 100 is applied on the production line, the operation speed of the production line will be significantly increased.

On the other hand, by adapting multicasting method, when the second device 130 needs to transmit the communication device firmware file 134 to the numerous first devices 110, the second device 130 only needs to output a single communication streaming. In the other words, the number of the first devices 110 that can be updated simultaneously will not be limited by the output bandwidth or the data processing capability of the second device 130.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled to a second device, it means that the first device may be directly or indirectly connected to the second device through electrical connections, wireless communications, optical communications, or other signal connections with/without other intermediate devices or connection means.

Other embodiments of the disclosure will be apparent to those skilled in the art from consideration of the specification and practice of the disclosure disclosed herein. It is intended that the specification and examples be considered as exemplary only, with a true scope and spirit of the disclosure indicated by the following claims.

What is claimed is:

1. A communication device updating system, comprising:
    a network switch;
    a plurality of first devices, wherein each of the plurality of first devices is communicatively coupled to the network switch; and
    a second device, communicatively coupled to the network switch, and configured to store a communication device firmware file, wherein the second device receives a plurality of download requests from the plurality of first devices, and the second device compares a number of the plurality of download requests with a first threshold, and the second device calculates a time length of no download request received by the second device,
    wherein when the number of the plurality of download requests is larger than the first threshold, the second device multicasts the communication device firmware file to each of the plurality of first devices, and each of the plurality of first devices is updated according to the received communication device firmware file,
    when the number of the plurality of download requests is smaller than or equal to the first threshold and the time length is larger than or equal to a second threshold, the second device multicasts the communication device firmware file to each of the plurality of first devices, when the number of the plurality of download requests is smaller than or equal to the first threshold and the time length is smaller than the second threshold, if the second device receives a new download request, the second device updates the number of the plurality of download requests and compares the updated number of the plurality of download requests with the first threshold again to determine whether to multicast the communication device firmware file.

2. The communication device updating system of claim 1, wherein when each of the plurality of first devices detects an operational input or receives a connection indication transmitted from the second device, each of the plurality of first devices transmits a corresponding one of the plurality of download requests to the second device.

3. The communication device updating system of claim 1, wherein when the second device multicasts the communication device firmware file, the second device transmits a communication streaming comprising the communication device firmware file to the network switch, and the network switch copies the communication streaming and transmits a plurality of copied communication streaming to the plurality of first devices respectively, so that the plurality of first devices receive the communication device firmware files.

4. The communication device updating system of claim 1, wherein each of the plurality of first devices comprises:
a verification unit, configured to verify whether the communication device firmware file received by the first device is complete according to a checksum of the communication device firmware file received by the first device.

5. The communication device updating system of claim 4, wherein each of the plurality of first devices further comprises:
an alarm unit;
wherein when the verification unit determines that the communication device firmware file received by the first device is not complete, the alarm unit generates a predetermined sound, a predetermined lighting pattern, or a combination of the predetermined sound and the predetermined lighting pattern.

6. The communication device updating system of claim 1, wherein the plurality of first devices comprise at least one modem or at least one router.

7. A communication device updating system comprising:
a plurality of first devices;
a second device, configured to store a communication device firmware file, and configured to transmit a status confirming request, wherein the second device calculates a cumulative number of times of the status confirming request is transmitted;
a network switch, comprising a plurality of connection ports, wherein each of the plurality of connection ports is configured to communicatively couple to one of the plurality of first devices or the second device;
wherein the network switch is configured to transmit a first service status of the plurality of connection ports to the second device in response to the status confirming request, the second device determines a first total connection number of the plurality of connection ports according to the first service status, and the second device further compares the first total connection number with a first threshold,
when the first total connection number is larger than the first threshold, the second device multicasts the communication device firmware file to each of the plurality of first devices,
when the first total connection number is smaller than or equal to the first threshold, if the cumulative number is smaller than a second threshold, the second device transmits the status confirming request again to the network switch in order to obtain a second service status, and the second device determines a second total connection number of the plurality of connection ports according to the second service status,
if the first total connection number is equal to the second total connection number, the second device multicasts the communication device firmware file, and if the first total connection number is different from the second total connection number, the second device stops to multicast the communication device firmware file.

* * * * *